US010802457B2

(12) United States Patent
Jefferies et al.

(10) Patent No.: US 10,802,457 B2
(45) Date of Patent: Oct. 13, 2020

(54) CENTRALIZED MOTOR THERMAL MEMORY MANAGEMENT

(71) Applicant: SCHNEIDER ELECTRIC USA, INC., Andover, MA (US)

(72) Inventors: Kevin M Jefferies, Raleigh, NC (US); Benjamin W Edwards, Rolesville, NC (US)

(73) Assignee: Schneider Electric USA, Inc., Andover, MA (US)

( * ) Notice: Subject to any disclaimer, the term of this patent is extended or adjusted under 35 U.S.C. 154(b) by 187 days.

(21) Appl. No.: 15/790,562

(22) Filed: Oct. 23, 2017

(65) Prior Publication Data

US 2019/0121311 A1   Apr. 25, 2019

(51) Int. Cl.
| | |
|---|---|
| G05B 19/05 | (2006.01) |
| H02P 1/02 | (2006.01) |
| H02H 3/00 | (2006.01) |
| H02H 6/00 | (2006.01) |
| G06F 1/20 | (2006.01) |
| G06F 3/06 | (2006.01) |

(52) U.S. Cl.
CPC ............ *G05B 19/05* (2013.01); *G06F 1/206* (2013.01); *G06F 3/065* (2013.01); *G06F 3/0625* (2013.01); *G06F 3/0634* (2013.01); *G06F 3/0679* (2013.01); *H02H 3/006* (2013.01); *H02H 6/005* (2013.01); *H02P 1/02* (2013.01); *H02P 1/029* (2013.01); *G05B 2219/25368* (2013.01)

(58) Field of Classification Search
None
See application file for complete search history.

(56) References Cited

U.S. PATENT DOCUMENTS

| | | | |
|---|---|---|---|
| 8,472,274 | B2 | 6/2013 | Fai et al. |
| 2002/0191363 | A1 | 12/2002 | Krauss et al. |
| 2003/0200038 | A1 | 10/2003 | Schweitzer, III et al. |
| 2008/0180196 | A1 | 7/2008 | Vicente et al. |

(Continued)

FOREIGN PATENT DOCUMENTS

CN   201107608 Y   8/2008

OTHER PUBLICATIONS

Extended European Search Report for European Patent Application No. 18200876.3 dated Feb. 12, 2019, 11 pages.

(Continued)

*Primary Examiner* — Gregory J Toatley, Jr.
*Assistant Examiner* — Terence E Stifter, Jr.
(74) *Attorney, Agent, or Firm* — Locke Lord LLP

(57) ABSTRACT

The overload relay units within a motor control group have the timing function for their motor thermal memories under the control of a central controller in communication with the overload relays. Thus expensive timing components and control of timestamps can be removed from individual overload relays. Further reduction of individual overload relay components can be accomplished by removing the nonvolatile memory function from the individual overload relays and allowing the central controller to perform the nonvolatile memory functions for the overload relays. The motor thermal model function for the overload relays can remain in the overload relays or might be moved to the central controller if communication bandwidth permits.

22 Claims, 7 Drawing Sheets

(56) References Cited

U.S. PATENT DOCUMENTS

| | | | |
|---|---|---|---|
| 2012/0194118 A1* | 8/2012 | Vicente | H02P 29/032 |
| | | | 318/473 |
| 2013/0042616 A1 | 2/2013 | Runkle et al. | |
| 2013/0144407 A1* | 6/2013 | Nausley | G05B 23/02 |
| | | | 700/79 |
| 2017/0179854 A1* | 6/2017 | Freeman | H02P 1/58 |

OTHER PUBLICATIONS

English Language Machine Translation of Chinese Patent Application Publication No. CN201107608Y, published on Aug. 27, 2008, 3 pages.

Examination Report for EP Patent Application No. 18200876.3 dated Mar. 25, 2020, 8 pages.

\* cited by examiner

FIG. 1 (Known art)

CENTRALIZED MOTOR THERMAL MEMORY MANAGEMENT

BACKGROUND OF THE INVENTION

1. Field of the Invention

The present invention relates to the management of motor thermal memory values for a plurality of overload relays for a plurality of motors or motor functions within a motor control group.

2. Discussion of the Art

A motor is typically protected by at least one overload relay to prevent damage to the motor from improper operation such as locked rotors, failure to start, overcurrents, etc., and attendant overheating of the motor.

A single motor utilized for more than one function will often have a plurality of overload relays assigned thereto to provide a single overload relay for each of the multiple functions. An overload relay, as used herein includes the circuit interupter function/apparatus at a motor controller which shuts off power to the motor in cases of dangerous or harmful motor operating conditions. Examples may include forward and reverse drives, multiple speed operations, and combinations thereof. Similarly, it is often the case that a plurality of motors are grouped together in functional units to control several tasks within a function and there will be a plurality of overload relays so that each motor will have at least one overload relay assigned to it. Examples may include a conveyor line with multiple sections, manufacture of an item with multiple operations requiring different motors, etc. In such cases each of the motors is individually stopped and started, or otherwise controlled, by a central controller such as programmable logic controllers (PLCs) or software control and data acquisition (SCADA) systems but protected by its own overload relay. As noted above, the same is often true for a single motor utilized for more than one function. Any such motor or group of motors may be referred to herein as a "motor control group."

Because overheating of motors represents a large expense in lost energy, replacement costs, and downtime, etc. to the operator, thermal memory is provided for each motor to prevent restart of the motor when it is too hot. Thermal memory is thus the modeling of the thermal state of a motor as it cools e.g., upon shut down, power failure etc.

Historically, the electromechanical technologies used in motor overload relays would model motor heating using a physical part which would dissipate power and increase in temperature. The temperature increase could be measured, or the overload relay would exploit a physical property of the physical part's material to cause a transition (such as in the case of melting alloy type devices) or a deformation (such as in bimetallic type devices). These devices could inherently implement a sort of thermal memory, because the physical representation included a thermal mass with an associated thermal decay. These were generally not truly accurate thermal representations of the motor cooling cycle, but could provide some protection against restarting too quickly after an overload condition activated a shut down of the motor.

The modern use of electronics in motor overload relays allows the use of more sophisticated motor thermal models and more accurate thermal memory. Thermal memory algorithms are known in the art which include the influence on motor cooling from parameters such as the temperature of motor rotor and motor stator, and the existence of auxiliary cooling fans, for example. In the known art, the thermal memory function is provided within the overload relay assigned to each motor and/or motor function. Each electronic overload relay thus currently contains a motor thermal model which includes apparatus operating the calculations by which the motor thermal memory is achieved. "Motor thermal memory" as referred to herein is a data set or value representing the thermal state of a motor.

SUMMARY OF THE INVENTION

The present invention achieves a beneficial cost reduction in such motor control groups by centralizing the management of motor thermal memory and removing the cost required for each individual motor overload relay to manage the thermal memory. In the present invention the thermal memory function, or parts thereof, can be placed and operated in a centrally connected controller or control system.

Electronics implementing a thermal memory must have a means of measuring time, which includes measuring time when the electronics are unpowered. The electronics must also be able to store values representing the state of the thermal model of the motor in a nonvolatile memory. Both of these functions require the use of specific components, which of course add costs. Many ways exist of measuring the duration of time, such as with clocks or measuring the decay of stored energy in capacitors, and many types of nonvolatile memories exist, such as EEPROM and FLASH. Some ways are more versatile than others, for example an embodiment measuring time with a clock will be more accurate over long periods of time than an embodiment using the decay of stored energy in capacitors. However, increasing the accuracy and versatility of an embodiment generally increases the complexity and cost of that embodiment as well. With the placement of the thermal memory into the central controller, the implementation of more cost efficient, versatile and/or more accurate thermal memory equipment and functions can be had over the use of similar equipment distributed over individual motor overload relays.

In a first embodiment of the present invention all clock functions are removed from the overload relays and given over to the central controller. In a second embodiment all clock functions plus the nonvolatile memory are given over from the overload relays to the central controller. Thus, savings on components in the overload relays can afford better single component structures in the central controller resulting in cost saving and increased accuracy and reliability for the motor thermal memory.

Certain aspects of the present invention present a method of operating a central controller for motor thermal memory value management of a plurality of overload relays in a motor control group, comprising: a) installing a central controller which includes a source of time information and placing the central controller in communication with a plurality of overload relays which are individually paired with each of a plurality of motors or motor functions within the motor control group; b) generating a present time stamp in the central controller; c) calculating a current thermal memory value for each of the overload relays based on the time duration between the present timestamp and the stored timestamp and the thermal memory value pair; d) pairing the current thermal memory value to the present time stamp and storing the paired current thermal memory value and the present time stamp in a nonvolatile memory; e) removing power from the motor; and f) generating a new time stamp, calculating a new thermal memory value, and restarting the motor according to the new thermal memory value. Additional aspects may include those of the method above while including wherein the current thermal memory value is calculated by a Motor Thermal Model in the central controller.

Other aspects of the present invention present a motor control group including a plurality of overload relays for at least one motor, and a central controller in communication with each overload relay; wherein the central controller has a clock and a timestamp generator; while the overload relays have no clock function for a motor thermal model. Additional aspects may include the aspects of the motor control group above while further including the central controller having nonvolatile memory for the storage of paired timestamps and thermal memory values; and the overload relays having no nonvolatile memory for the storage of paired timestamps and thermal memory values.

BRIEF DESCRIPTION OF THE DRAWINGS

The foregoing and other advantages of the disclosed embodiments will become apparent upon reading the following detailed description and upon reference to the drawings, wherein.

DETAILED DESCRIPTION

As an initial matter, it will be appreciated that the development of an actual commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Words of degree, such as "about," "substantially," and the like are used herein in the sense of "at, or nearly at, when given the manufacturing, design, and material tolerances inherent in the stated circumstances" and are used to prevent the unscrupulous infringer from unfairly taking advantage of the invention disclosure where exact or absolute figures and operational or structural relationships are stated as an aid to understanding the invention.

Figure 1:
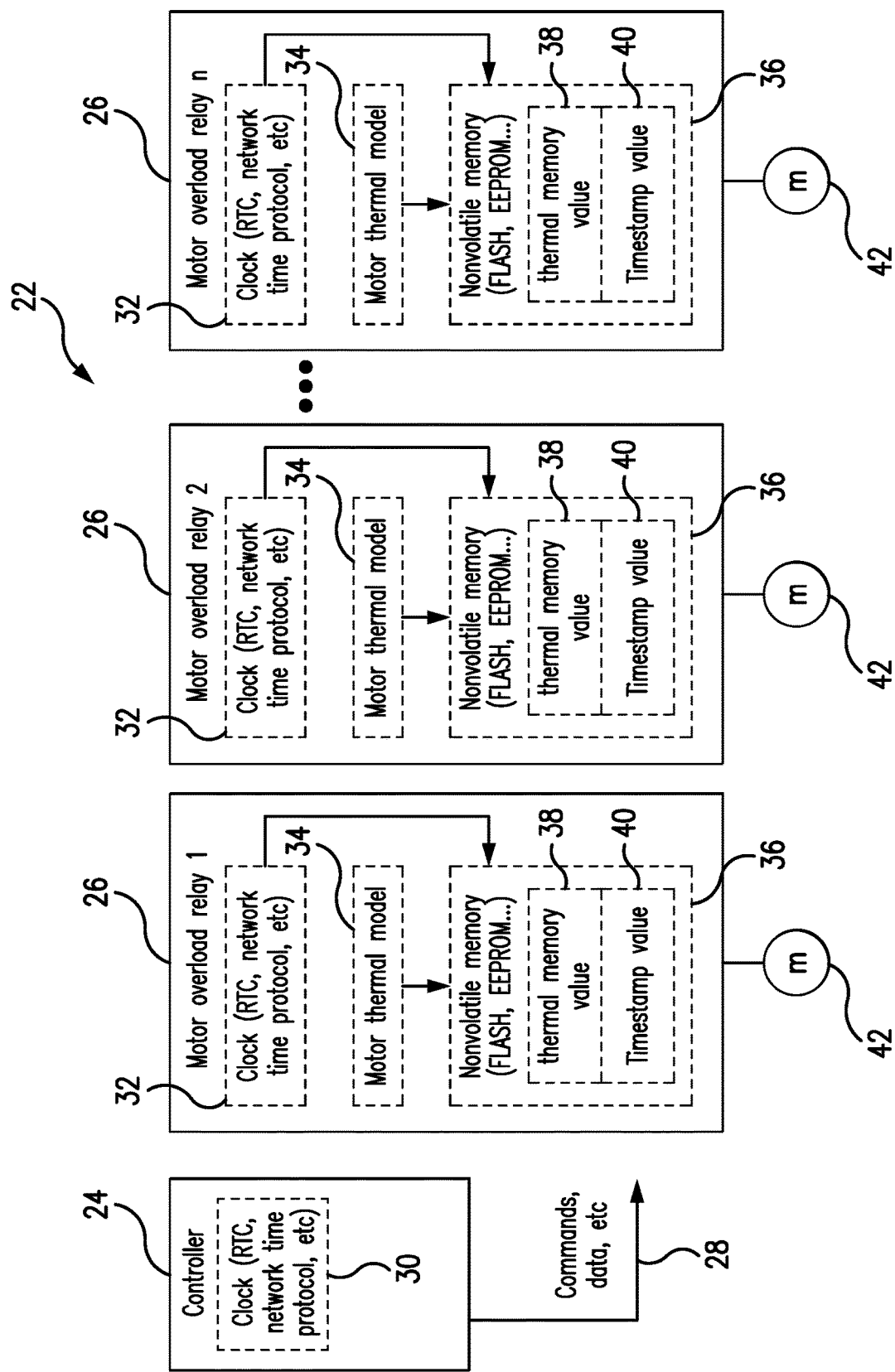
FIG. 1 is a known example of a motor control group.

As seen in FIG. 1, a known system for implementing a Motor Control Group 22 includes a central controller 24 managing multiple (n) motor overload relays, collectively 26, via a communications link 28 of any suitable type. The controller, typically a PLC or a networked SCADA application, is necessarily equipped with a time clock 30 for its internal operations. Each overload relay 26 is paired with one motor 42, or one motor function, and is equipped with an internal time keeper, i.e. "clock," 32; a motor thermal model 34 (described above); and an on-board nonvolatile memory 36 for storing thermal memory values 38 and timestamp values 40 as required to implement protection of the individual motors or motor functions, collectively 42, associated with the individual overload relays 26.

Figure 2:
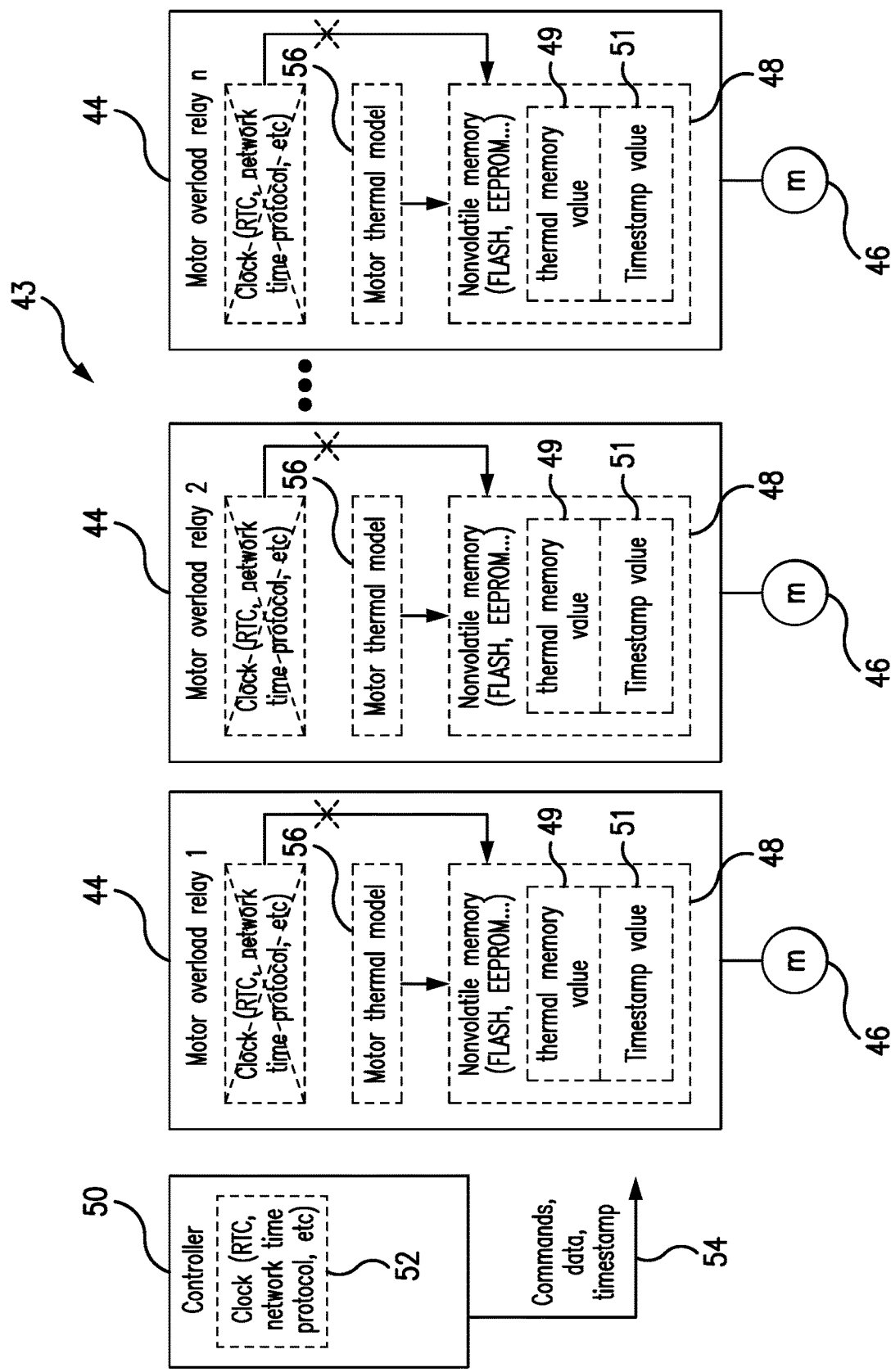
FIG. 2 illustrates aspects of the present invention according to a first embodiment.

Referring to FIG. 2, in a first aspect of the invention, one embodiment of a new motor control group 43 uses overload relays 44 which implement thermal protection for their paired motors 46. The overload relays 44 still each include a nonvolatile memory 48 for storing a thermal memory value 49 calculated via a motor thermal model 56 located in the overload relay 44. The on-board nonvolatile memory of the overload relays will store paired sets of thermal memory values 49 and timestamp values 51. But the overload relays 44 no longer contain a clock function because the central controller device 50 (PLC or SCADA program etc.), which is in communication with the overload relays 44, includes a source of time information generically referred to here as a "clock" 52, although it will be appreciated the time information may come from any of several sources either internally (real time clock) or on a network (network time protocol, etc.).

The central controller 50 is given apparatus and functionality to periodically formulate a timestamp and communicate it to the individual overload relays 44 along a communication channel 54, by which the central controller 50 may also communicate various commands to, and may receive information from, the overload relays 44. The timestamps 51 are paired with a thermal memory value 49 and stored in the onboard nonvolatile memory 48 of each of the overload relays 44. The overload relays 44 in this embodiment retain their functionality and apparatus for individual Motor Thermal Models 56 so as to be distributed throughout the motor control group.

Figure 3:
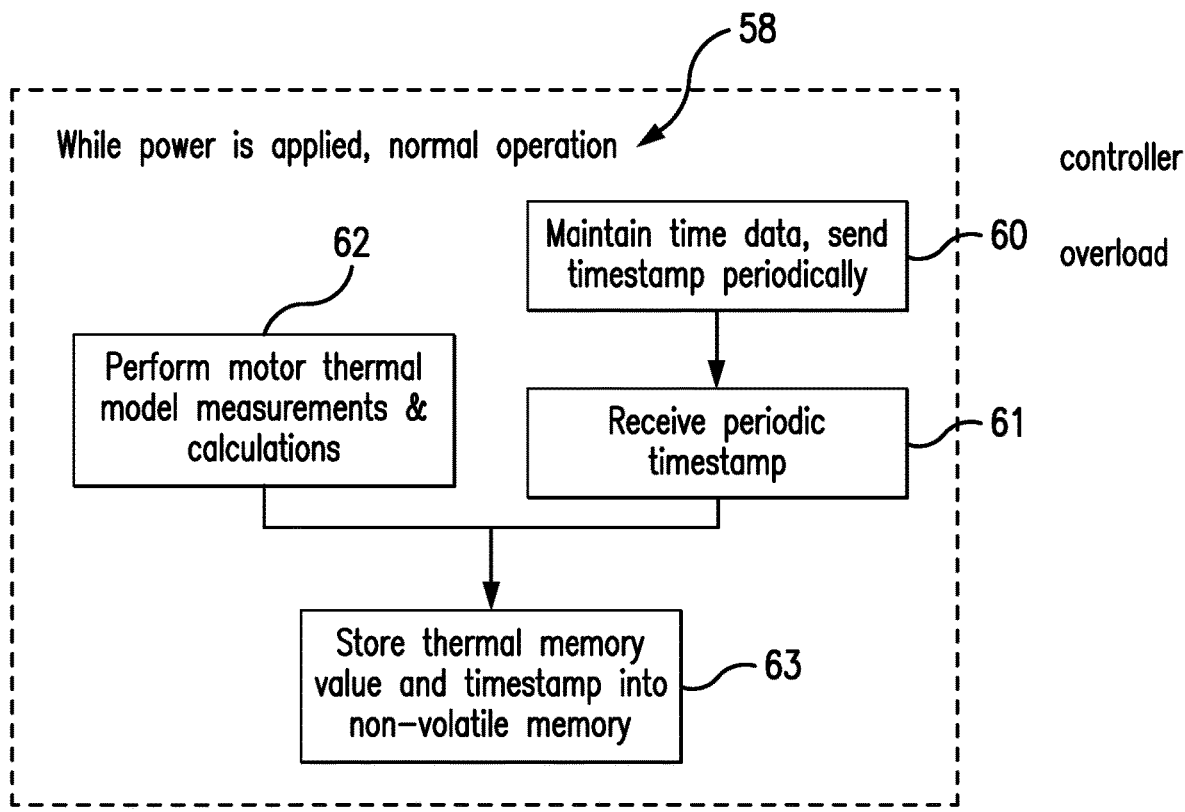
FIG. 3 is a block diagram of operations of the embodiment of FIG. 2 under normal operation.

Referring also to FIG. 3, an operational method of the embodiment of FIG. 2 is illustrated. While there is power applied and the overload relay electronics are operating normally 58, at receipt 61 at each timestamp by the overload relay 44, as periodically sent 60 from the controller 50, the overload relay 44 stores 63 in its nonvolatile memory 48 the thermal memory value 49 calculated 62 from its thermal model 56, as paired with the current, i.e. just received, timestamp value 51. The overload relay does this continuously, while the motor 46 is heating and cooling.

Figure 4:
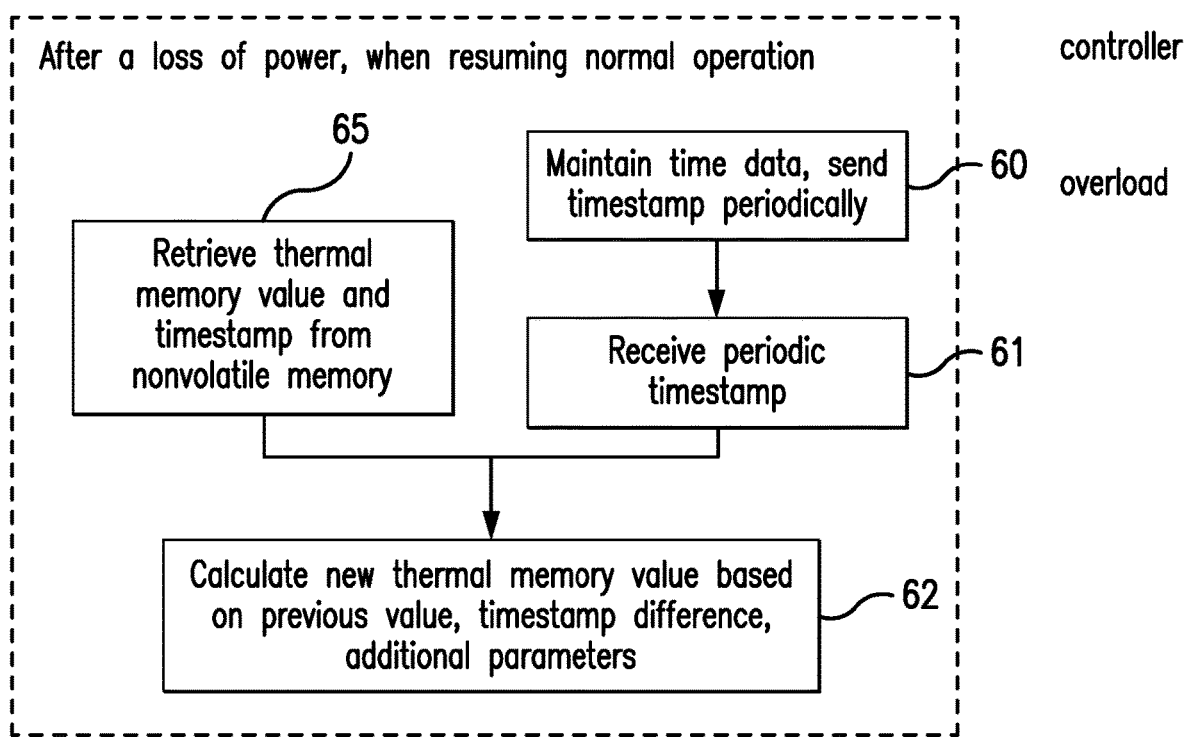
FIG. 4 is a block diagram of operations of the embodiment of FIG. 2 upon restart of a motor.

Referring to FIG. 4, In the case of a loss of power to a motor, e.g. such as by operation of the protective function of the overload relay; when power is restored and a new timestamp is received, the overload relay calculates 62 a new (updated) thermal memory value is calculated 62 based on the time duration between the current (updated) timestamp and the stored timestamp and thermal memory value 65. The calculation of motor cooling for the thermal memory can be done using known algorithms, including taking into account parameters such as the presence of an auxiliary cooling fan, etc. so that the motor may be restarted safely according to its thermal state.

In a power restoration case where no timestamp is received, e.g. due to loss of communication with the controller, inability of the controller to get time information, etc., the overload relay may assume that zero time has passed from when the thermal memory value was stored, ensuring that the motor is protected.

Figure 5:
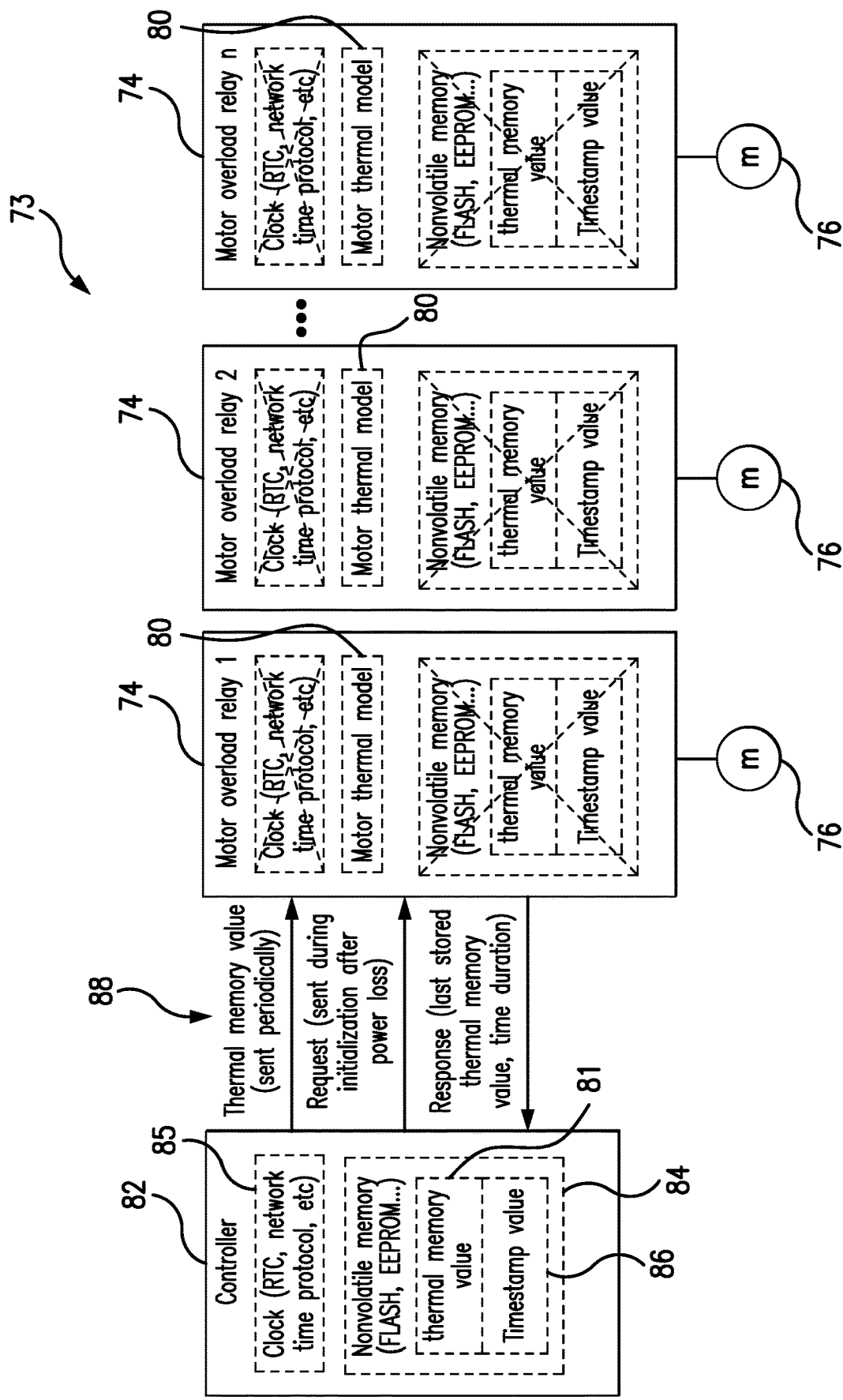
FIG. 5 illustrates aspects of the invention according to a second embodiment.

Referring to FIG. 5, in a second aspect of the invention, a second embodiment of a new motor control group 73 uses overload relays 74 which implement thermal protection for their accompanying motors 76. The overload relays 74 in this embodiment no longer include a nonvolatile memory for storing a thermal memory value as calculated via the motor thermal model 80 located in the overload relay 74. Instead, the thermal memory value 81 is now stored in the Central Controller 82 where the apparatus and function of the nonvolatile memory 84 has been moved to store each paired thermal memory value 81 and timestamp value 86 for the individual overload relays 74. Like the previous embodiment, the overload relays 74 no longer retain their clock functions.

The central controller 82 is now given apparatus and functionality to periodically formulate a timestamp 86 and communicate it to the individual overload relays 74 along a communication channel 88, by which the central controller 82 and the overload relays 74 may communicate. The timestamps 86 are paired with the thermal memory value 81 of each overload relay 74 and stored in the nonvolatile memory 84 of the central controller 82. The overload relays 74 in this embodiment retain their functionality and apparatus for individual motor thermal models 80 so as to be distributed throughout the motor control group 73. In alternative embodiments, if sufficient bandwidth and speed are available with the communications functions of a motor control group, the motor thermal model functionality might also be taken out of the overload relays and placed in the central controller.

Figure 6:
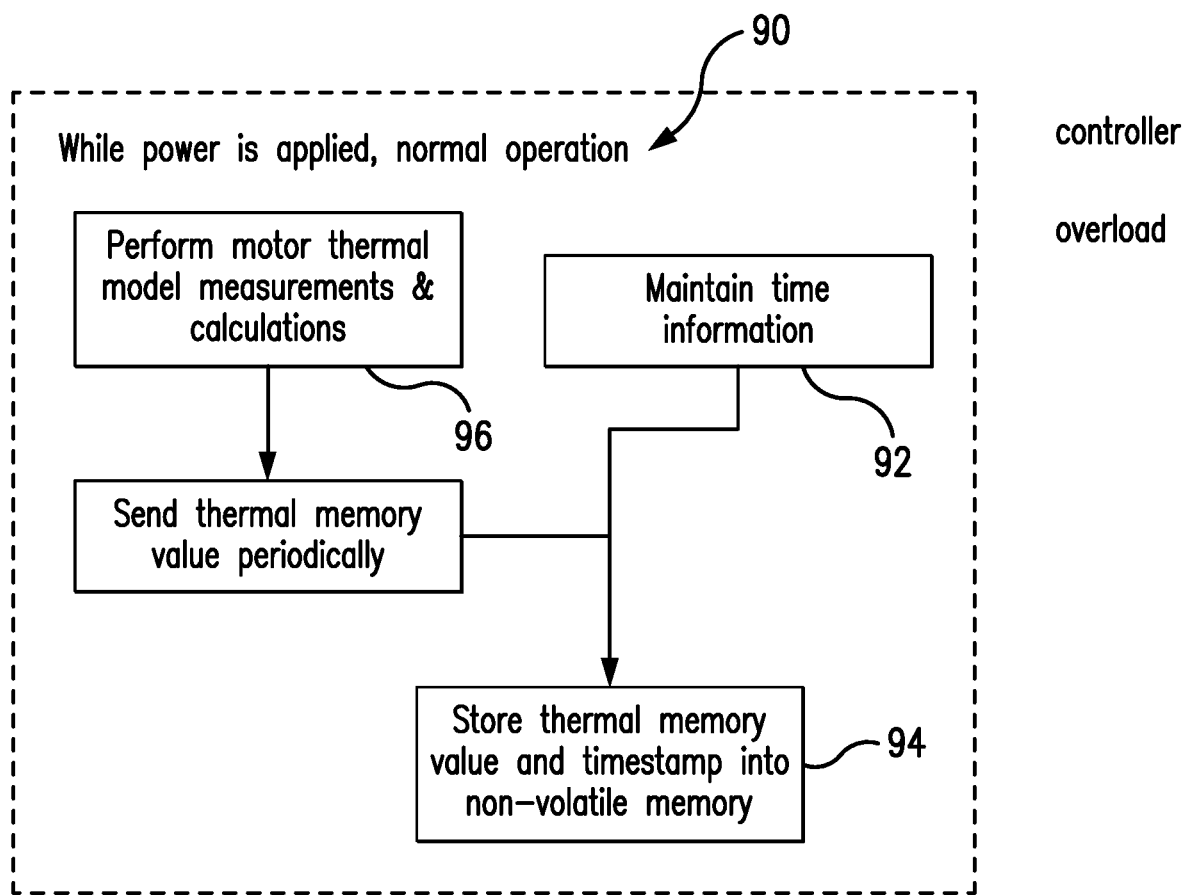
FIG. 6 is a block diagram of operations of the embodiment of FIG. 5 under normal operation.

Referring to FIG. 6, an operational method of the embodiment of FIG. 5 is illustrated. While there is power applied and the overload relay electronics are operating normally 90, a timestamp is periodically sent 92 from the controller 82 to the overload relay 74. At the receipt of each timestamp 86 the overload relay calculates 96 the thermal memory value 81 via its thermal model 80. The thermal memory value 81 is then sent to the controller 82 and is paired 94 with the current, i.e. just received, timestamp value 86, in the controller's nonvolatile memory 84.

Figure 7:
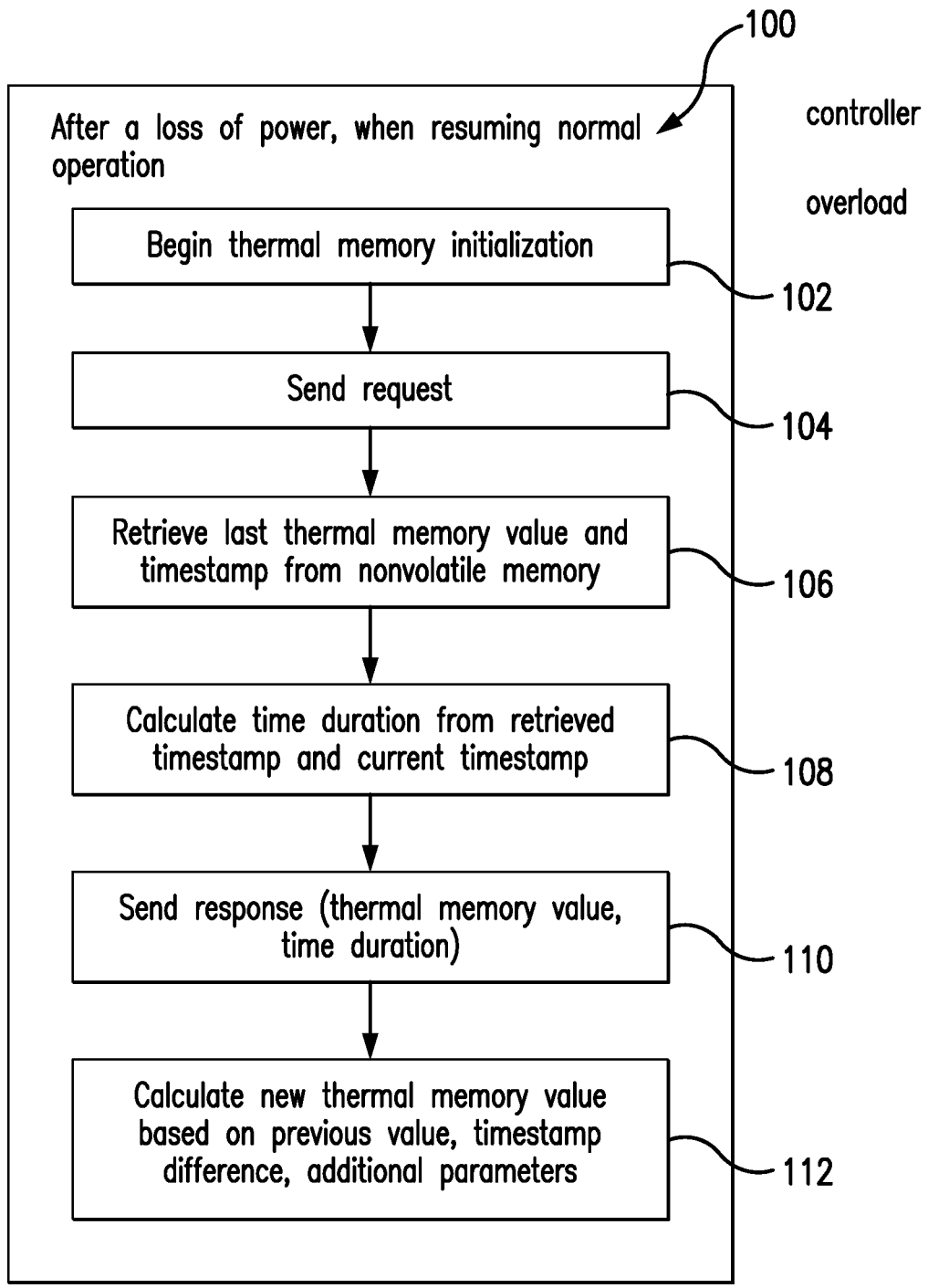
FIG. 7 is a block diagram of operations of the embodiment of FIG. 5 upon restart of a motor.

Referring also to FIG. 7, in the case of a loss of power to a motor overload relay 74, or to the entire system 73 including the relay 74 and controller 82, when power is restored, 100 the affected relay performs a process to initialize 102 its thermal memory value 80 based on the duration of the loss of power and its previous (stored) thermal memory value. The relay 74 sends a request 104 to the controller 82 for elapsed time, i.e. time stamp differences. The controller retrieves the last thermal memory value and time from nonvolatile memory, calculates the time duration between the retrieved (stored) time stamp and a current timestamp 108, and sends a response 110 to the overload relay providing the last stored thermal memory value for the overload relay and the time duration between the timestamp associated with that thermal memory value and the current timestamp. The affected overload relay 74 receives the response and calculates 112 a new thermal memory value, via its motor thermal model 80, based on the time duration, last stored thermal memory value, and any additional parameters such as the presence of an auxiliary cooling fan, etc. Alternatively, the controller could do the calculation of the new thermal memory value. In the case where the controller 82 cannot determine the time duration of a loss and restoration of power (e.g., due to loss of communications with the time source, battery depletion, etc.) the time duration sent to the overload relay on initialization will be set to zero, ensuring that the motor is protected.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the invention as defined in the appended claims.

The invention claimed is:

1. A method of operating a central controller for motor thermal memory value management of a plurality of overload relays in a motor control group, comprising:
   installing a central controller which includes a source of time information and placing the central controller in communication with a plurality of overload relays which are individually paired with each of a plurality of motors or motor functions within the motor control group;
   generating a present time stamp in the central controller;
   calculating, via a motor thermal model, a current thermal memory value for each of the overload relays based on a last stored thermal memory value and a time duration between the present time stamp and a stored time stamp;
   pairing the current thermal memory value to the present time stamp and storing the paired current thermal memory value and the present time stamp in a nonvolatile memory;
   removing power from a motor;
   generating a new time stamp;
   calculating, via the motor thermal model, a new thermal memory value for each of the overload relays based on the current thermal memory value and a time duration between the new time stamp and the stored time stamp; and
   restarting the motor according to the new thermal memory value.

2. The method of claim 1 wherein the current thermal memory value is calculated by a motor thermal model located in the central controller.

3. A motor control group including a plurality of overload relays for at least one motor, and a central controller in communication with each overload relay; wherein the
   central controller has a clock and a timestamp generator for a thermal model; and
   the overload relays have no clock function for a motor thermal model.

4. The motor control group of claim 3 further comprising:
   the central controller having nonvolatile memory for the storage of paired timestamps and thermal memory values; and
   the overload relays having no nonvolatile memory for the storage of paired timestamps and thermal memory values.

5. The method of claim 1, wherein the source of time information is a clock, and the present time stamp and the new time stamp are generated by a timestamp generator.

6. The method of claim 1, wherein removing power from the motor is by a shutdown or a power failure.

7. The method of claim 5, wherein the clock of the central controller provides timing functions for each of the individual overload relays, which have no individual clock.

8. The method of claim 5, wherein the timestamp generator resides in the central controller, not in the individual overload relays.

9. The method of claim 1, wherein the nonvolatile memory resides in the central controller, not in the individual overload relays.

10. The method of claim 9, wherein the motor thermal model resides in nonvolatile memory of the central controller, not in the individual overload relays.

11. The method of claim 1, wherein the removing of power from the motor can be initiated by individual overload relays.

12. A central controller for motor thermal memory value management of a plurality of overload relays in a motor control group, the central controller in communication with the plurality of overload relays which are individually paired with each of a plurality of motors or motor functions within the motor control group, the central controller comprising a source of time information and wherein the central controller is configured to:
   generate a present time stamp;
   calculate, via a motor thermal model, a current thermal memory value for each of the overload relays based on a last stored thermal memory value and a time duration between the present time stamp and a stored time stamp;
   pair the current thermal memory value to the present time stamp and store the paired current thermal memory value and the present time stamp in a nonvolatile memory;
   remove power from a motor;
   generate a new time stamp;
   calculate, via the motor thermal model, a new thermal memory value for each of the overload relays based on the current thermal memory value and a time duration between the new time stamp and the stored time stamp; and
   restart the motor according to the new thermal memory value.

13. The controller of claim 12, wherein the source of time information is a clock, and the present time stamp and the new time stamp are generated by a timestamp generator.

14. The controller of claim 12, wherein removing power from the motor is by a shutdown or a power failure.

15. The controller of claim 13, wherein the clock of the central controller provides timing functions for each of the individual overload relays, which have no individual clock.

16. The controller of claim 13, wherein the timestamp generator resides in the central controller, not in the individual overload relays.

17. The controller of claim 12, wherein the nonvolatile memory resides in the central controller, not in the individual overload relays.

18. The controller of claim 17, wherein the motor thermal model resides in nonvolatile memory of the central controller, not in the individual overload relays.

19. The controller of claim 12, wherein the removing of power from the motor can be initiated by individual overload relays.

20. A central controller for operating a plurality of overload relays, each associated with a motor in a motor control group, the central controller comprising:
   a clock providing timing functions for each of the plurality of overload relays;
   a timestamp generator associated with the clock for generating timestamps,
   wherein the central controller is configured to calculate, via a motor thermal model, a thermal memory value for each of the plurality of overload relays, each thermal memory value being paired with an associated timestamp;
   the central controller further comprising a nonvolatile memory for storing each calculated thermal memory value and its paired timestamp,
   wherein the central controller is further configured to start or restart motors of the motor control group according to their latest thermal memory value.

21. The central controller of claim 20, wherein the motor thermal model resides in a nonvolatile memory of each of the plurality of overload relays.

22. The central controller of claim 20, wherein the motor thermal model resides in the nonvolatile memory of the central controller.

* * * * *